United States Patent [19]

McAleer et al.

[11] Patent Number: 5,674,300
[45] Date of Patent: *Oct. 7, 1997

[54] FUEL OIL ADDITIVES AND COMPOSITIONS

[75] Inventors: Andrew Matthew McAleer, Winchester; Gerald Peter Yearwood, Reading, both of United Kingdom

[73] Assignee: Exxon Chemical Patents Inc., Linden, N.J.

[*] Notice: The term of this patent shall not extend beyond the expiration date of Pat. No. 5,151,204.

[21] Appl. No.: 622,235

[22] Filed: Mar. 20, 1996

Related U.S. Application Data

[62] Division of Ser. No. 916,155, filed as PCT/GB91/00148, Jan. 31, 1991, Pat. No. 5,525,128.

[30] Foreign Application Priority Data

Jan. 31, 1990 [GB] United Kingdom .................. 9002133

[51] Int. Cl.$^6$ ........................................................ C08L 1/16
[52] U.S. Cl. ............................ 44/459; 524/239; 524/570
[58] Field of Search ............................... 44/459; 524/239, 524/570

[56] References Cited

U.S. PATENT DOCUMENTS

| | | | |
|---|---|---|---|
| 4,211,534 | 7/1980 | Feldman | 44/62 |
| 4,668,834 | 5/1987 | Rim et al. | 585/12 |
| 5,017,299 | 5/1991 | Gutierrez et al. | 252/51.5 R |
| 5,151,204 | 9/1992 | Struglinski | 252/52 R |

FOREIGN PATENT DOCUMENTS

| | | |
|---|---|---|
| 128046 | 12/1984 | European Pat. Off. . |
| 129368 | 12/1984 | European Pat. Off. . |
| 260999 | 3/1988 | European Pat. Off. . |

OTHER PUBLICATIONS

"Journal of the Institute of Petroleum" 52 (1966), 173 to 185.

W. W. Yau, J. J. Kirkland and D. D. Bly "Modern Size Exclusion Liquid Chromatography" Book not provided John Wily & Sons, New York, 1979.

Primary Examiner—Peter D. Mulcahy
Attorney, Agent, or Firm—John J. Mahon

[57] ABSTRACT

Wax crystal modifiers for fuel oils are derived from ethylene-alpha olefin polymers with terminal unsaturation, preferably obtained by polymerization in the presence of a metallocene catalyst, optionally together with other cold flow improvers.

14 Claims, No Drawings

FUEL OIL ADDITIVES AND COMPOSITIONS

This is a divisional, of application Ser. No. 916,155, filed as PCT/GB91/00148, Jan. 31, 1991, U.S. Pat. No. 5,525, 128.

This invention relates to fuel compositions, and more especially to fuel compositions susceptible to wax formation at low temperatures.

Heating oils and other distillate petroleum fuels, for example, diesel fuels, contain alkanes that at low temperature tend to precipitate as large crystals of wax in such a way as to form a gel structure which causes the fuel to lose its ability to flow. The lowest temperature at which the fuel will still flow is known as the pour point.

As the temperature of the fuel falls and approaches the pour point, difficulties arise in transporting the fuel through lines and pumps. Further, the wax crystals tend to plug fuel lines, screens, and filters at temperatures above the pour point. These problems are well recognized in the art, and various additives have been proposed, many of which are in commercial use, for depressing the pour point of fuel oils. Similarly, other additives have been proposed and are in commercial use, for reducing the size and changing the shape of the wax crystals that do form. Smaller size crystals are naturally desirable since they are less likely to clog a filter; certain additives inhibit the wax from crystallizing as platelets and cause it to adopt an acicular habit, the resulting needles being more likely to pass through a filter than are platelets. The additives may also have the effect of retaining in suspension in the fuel the crystals that have formed, the resulting reduced settling also assisting in prevention of blockages.

The present invention is concerned to provide a fuel additive effective both to improve low temperature flow of the fuel and also to inhibit wax settling.

In one aspect, the present invention is directed to the use, as a wax crystal modifier in a fuel oil, of a copolymer derived from ethylene and at least one alpha-olefin of the formula $CH_2=CHR^1$ wherein $R^1$ represents an alkyl group having from 1 to 18 carbon atoms, at least 30% of the chains of which polymer have terminal ethenylidene unsaturation, the polymer having a number average molecular weight in the range of from 300 to 15000 and an ethylene content in the range of from 40 to 90 mole per cent, the polymer being obtainable by polymerization in the presence of a metallocene catalyst.

The invention also provides a fuel oil composition comprising the above-specified ethylene/alpha-olefin copolymer, advantageously one containing from 0.005% to 0.1%, preferably from 0.01 to 0.06%, by weight of the copolymer, based on the weight of the fuel oil. The fuel oil is more especially a middle distillate fuel oil and may be, for example, a straight run distillate or a fraction cracked either thermally or catalytically, or a mixture of any two or more such fuels.

The invention further provides a fuel oil additive concentrate comprising 2 to 90%, advantageously 5 to 50%, by weight of the specified copolymer in admixture with fuel oil or a solvent miscible with fuel oil.

The polymers employed in this invention are polymers of ethylene and at least one alpha-olefin having the formula $H_2C=CHR^1$ wherein $R^1$ is as defined above and wherein the polymer contains a high degree of terminal ethenylidene unsaturation. Preferably $R^1$ in the above formula is alkyl of from 1 to 8 carbon atoms, and more preferably is alkyl of 1 carbon atom. Therefore, useful comonomers with ethylene in this invention include, in addition to propylene, butene-1, hexene-1, octene-1,4-methylpentene-1, decene-1, dodecene-1, tridecene-1, tetradecene-1, pentadecene-1, hexadecene-1, heptadecene-1, octadecene-1, nonadecene-1 and mixtures thereof (e.g., mixtures of propylene and 1-butene, and the like).

The molar ethylene content of the polymers employed in this invention is advantageously from 50% to 80%, and preferably from 60% to 80%, although the peak of activity, as measured by the cold filter plugging point (CFPP) test varies somewhat depending on the molecular weight of the polymer and on the fuel under consideration. The CFPP test is that described in BS 2869, and the "Journal of the Institute of Petroleum", 52 (1966), 173 to 185, the disclosures of which are incorporated by reference herein.

The copolymers used in the invention have the advantage that their viscosities are lower than those of the ethylene-vinyl acetate copolymers in commercial use as fuel additives, and fuel oils containing them may show less haze.

When propylene is the comonomer, copolymers in which $Mn \geq 60$ (% propylene by weight)−540 or $Mn \geq 6100−61$ (mole % ethylene)

have higher wax anti-settling (WAS) activity than copolymers where that requirement is not met, Mn being the number average molecular weight of the polymer, this being between 300 and 15000, as indicated above.

More especially, in a fuel oil identified herein as Tank 198, a wider boiling range fuel oil (initial boiling point 178° C.; final b.p. 377° C.; 90%-20%, 124° C.), maximum activity lies in the range of 20 to 50% propylene by weight (60 to 86 mole percent ethylene) and Mn of 700 and 3500.

In a fuel oil identified herein as 80126/89, a narrower boiling range fuel oil (initial b.p. 163° C.; final b.p. 360° C.; 90%-20%, 95° C.), maximum activity lies in the range of 25 to 60% by weight propylene (50 to 82 mole percent ethylene) and Mn between 1350 and 3300.

The polymers employed in this invention generally possess a number average molecular weight of from about 300 to about 15000, advantageously of from about 600 to about 10000, preferably of from about 700 to about 5,000; most preferably of from about 700 to about 3500. The number average molecular weight for such polymers may be determined by several known techniques. A convenient method for such determination is by size exclusion chromatography (also known as gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.).

Consequently, such polymers generally possess an intrinsic viscosity (as measured in tetralin at 135° C.) of between about 0.025 and about 0.6.dl/g, preferably of between about 0.05 dl/g, most preferably of between about 0.075 and about 0.4 dl/g.

The polymers employed in this invention are further characterized in that the polymer chains possess terminal ethenylidene-type unsaturation. Thus, one end of snch polymers will be of the formula $POLY-C(R^1)=CH_2$ wherein $R^1$ is as defined above and POLY represents the polymer chain. A minor amount of the polymer chains may contain terminal ethenyl unsaturation, i.e. $POLY-CH=CH_2$, and a portion of the polymer may contain internal mono-unsaturation. Preferably at least about 50 percent, more preferably at least about 60 percent, and most preferably at least about 75 percent (e.g. 75–98%), of the polymer chains exhibit terminal ethenylidene unsaturation. The percentage of polymer chains exhibiting terminal ethenylidene unsaturation may be determined by FTIR spectroscopic analysis, titration, or $C^{13}$NMR.

The polymer may be prepared as described in U.S. Pat. No. 4,668,834, EP-A-128,046 and 129,368, and EP-A-0260999.

The polymers for use in the aforementioned aspects of the present invention may be prepared by polymerizing monomer mixtures comprising ethylene in combination with the other monomer or monomers in the presence of a catalyst system comprising at least one metallocene (e.g., a cyclopentadienyl-transition metal compound) and an alumoxane compound. The comonomer content may be controlled through the selection of the metallocene catalyst component and by controlling the partial pressure of the various monomers.

The catalysts employed in the production of the polymers are organometallic coordination compounds which are cyclopentadienyl derivatives of a Group 4b metal of the Periodic Table of the Elements (56th Edition of Handbook of Chemistry and Physics, CRC Press [1975]) and include mono, di and tricyclopentadienyls and their derivatives of the transition metals. Particularly desirable are the metallocene of a Group 4b metal such as titanium, zirconium, and hafnium. The alumoxanes employed in forming the reaction product with the metallocenes are themselves the reaction products of an aluminum trialkyl with water.

In general, at least one metallocene compound is employed in the formation of the catalyst. As indicated, supra, metallocene is a metal derivative of a cyclopentadiene. The metallocenes usefully employed in accordance with this invention contain at least one cyclopentadiene ring. The metal is selected from the Group 4b preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent ( e. g., up to 5 $C_1$ to $C_5$ hydrocarbyl substituents) or other substituents, e.g. such as, for example, a trialkyl silyl substituent. The metallocene can contain one, two, or three cyclopentadienyl rings; however, two rings are preferred.

Useful metallocenes can be represented by the general formulas:

I. $(Cp)_m MR_n X_q$ 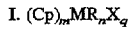

wherein Cp is a cyclopentadienyl ring, M is a Group 4b transition metal, R is ao hydrocarbyl group or hydrocarboxy group having from 1 to 20 carbon atoms, X is a halogen, and m is a whole number from 1 to 3, n is a whole number from 0 to 3, and q is a whole number from 0 to 3.

II. $(C_5R'_k)_s R''_s (C_5R'_k) MQ_{3-s}$ and 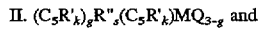

III. $R''_s(C_5R'_k)_2 MQ'$ 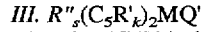

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms, a silicon containing hydrocarbyl radical, or hydrocarbyl radicals wherein two carbon atoms are Joined together to form a $C_4$–$C_6$ ring, R" is a $C_1$–$C_4$ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1, and k is 5 when s is 0, and M is as defined above. Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary silicon containing hydrocarbyl radicals are trimethylsilyl, triethylsilyl and triphenylsilyl. Exemplary halogen atoms include chlorine, bromine, fluorine and iodine and of these halogen atoms, chlorine is preferred. Exemplary hydrocarboxy radicals are methoxy ethoxy, butoxy, amyloxy and the like. Exemplary of the alkylidene radicals is methylidene, ethylidene and propylidene.

Illustrative, but non-limiting examples of the metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl) zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride bis(cyclopentadienyl)titanium phenyl chloride, bis(cyclopentadienyl)zirconium hydrochloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide, bis(cyclopentadienyl)titanium methyl iodide, bis(cyclopentadienyl)titanium ethyl bromide, bis(cyclopentadienyl)titanium ethyl iodide, bis(cyclopentadienyl)titanium phenyl bromide, bis(cyclopentadienyl)titanium phenyl iodide, bis(cyclopentadienyl)zirconium methyl bromide, bis(cyclopentadienyl)zirconium methyl iodide, bis(cyclopentadienyl)zirconium ethyl bromide, bis(cyclopentadienyl)zirconium ethyl iodide, bis(cyclopentadienyl)zirconium phenyl bromide, bis(cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed are monocyclopentadienyls titanocenes such as, pentamethylcyclopentadienyl titanium trichloride, pentaethylcyclopentadienyl titanium trichloride, bis(pentamethylcyclopentadienyl) titanium diphenyl, the carbene represented by the formula bis(cyclopentadienyl)titanium=$CH_2$ and derivatives of this reagent such as bis(cyclopentadienyl)Ti=$CH_2 \cdot Al(CH_3)_3$, $(Cp_2TiCH_2)_2$, $Cp_2TiCH_2CH(CH_3)CH_2$, $Cp_2Ti-CH_2CH_2CH_2$; substituted bis(Cp)Ti(IV) compounds such as bis(indenyl) titanium diphenyl or dichloride, bis (methylcyclopentadienyl)titanium diphenyl or dihalides; dialkyl, trialkyl, tetra-alkyl and penta-alkyl cyclopentadienyl titanium compounds such as bis(1,2- dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethylsilyldicyclopentadienyl titanium diphenyl or dichloride, methyl phosphine dicyclopentadienyl titanium diphenyl or dichloride, methylenedicyclopentadienyl titanium diphenyl or dichloride and other complexes described by formulae II and III.

Illustrative but non-limiting examples of the zirconocenes of Formula II and III which can be usefully employed are, pentamethylcyclopentadienyl zirconium trichloride, pentaethylcyclopentadienyl zirconium trichloride, the alkyl substituted cyclopentadienes, such as bis (ethylcyclopentadienyl) zirconium dimethyl, bis(beta-phenylpropylcyclopentadienyl) zirconium dimethyl, bis (methylcyclopentadienyl) zirconium dimethyl, bis(n-butylcyclopentadienyl) zirconium dimethyl bis (cyclohexylmethylcyclopentadienyl) zirconium dimethyl bis(n-octyl-cyclopentadienyl)zirconium dimethyl, and haloalkyl and dihydride, and dihalide complexes of the above; dialkyl, trialkyl, tetra-alkyl, and penta-alkyl cyclopentadienes, such as bis (pentamethylcyclopentadienyl) zirconium diphenyl, bis (pentamethylcyclopentadienyl) zirconium dimethyl, bis(1,2-dimethylcyclopentadienyl) zirconium dimethyl and mono and dihalide and hydride complexes of the above; silicon, phosphorus, and carbon bridged cyclopentadiene complexes such as dimethylsilyldicyclopentadienyl zirconium dimethyl, methyl halide or dihalide, and methylene dicyclopentadienyl zirconium dimethyl, methyl halide, or dihalide. Mono, di and tri-silyl substituted cyclopentadienyl compounds such as bis(trimethylsilylcyclopentadienyl) zirconium dichloride and dimethyl bis(1,3-di-trimethylsilylcyclopentadienyl) zirconium dichloride and dimethyl and bis(1,2,4-tri-trimethylsilylcyclopentadienyl) zirconium dichloride and dimethyl. Carbenes represented by the formulae $Cp_2Zr=CH_2P(C_6H_5)_2CH_3$, and derivatives of these compounds such as

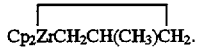

$Cp_2ZrCH_2CH(CH_3)CH_2$.

Mixed cyclopentadienyl metallocene compounds such as cyclopentadienyl (pentamethyl cyclopentadienyl)zirconium dichloride, (1,3-di-trimethylsilylcyclopentadienyl) (pentamethylcyclopentadienyl) zirconium dichloride, and cyclopentadienyl(indenyl) zirconium dichloride can be employed.

Bis(cyclopentadienyl)hafnium dichloride, bis (cyclopentadienyl)hafnium; dimethyl, bis(cyclopentadienyl) vanadium dichloride and the like are illustrative of other metallocenes.

Some preferred metallocenes are bis(cyclopentadienyl) zirconium; dimethyl, bis(cyclopentadienyl)zirconium dichloride; bis(cyclopentadienyl)titanium dichloride; bis (methylcyclopentadienyl)zirconium dichloride; bis (methylcyclopentadienyl)titanium dichloride; bis(n-butylcyclopentadienyl)zirconium dichloride; dimethylsilyldicyclopentadienyl zirconium dichloride; bis (trimethylsilycyclopentadienyl)zirconium dichloride; and dimethylsilyldicyclopentadienyl titanium dichloride; bis (indenyl)zirconium dichloride; bis(4,5,6,7-tetrahydroindenyl)zirconium dichloride; the racemic and/or meso isomer of 1,2-ethylene-bridged bis(4,5,6,7-tetrahydroindenyl)zirconium dichloride; the racemic and/or meso isomer of 1,1-dimethylsilyl-bridged bis(4,5,6,7-tetrahydroindenyl)zirconium dichloride; and the racemic and/or meso isomer of 1,1-dimethylsilyl-bridged bis (methylcyclopentadienyl)zirconium dichloride.

The alumoxane compounds useful in the polymerization process may be cyclic or linear. Cyclic alumoxanes may be represented by the general formula $(R-Al-O)_n$ while linear alumoxanes may be represented by the general formula $R(R-Al-O)n'AlR_2$. In the general formula R is a $C_1-C_5$ alkyl group such as, for example, methyl, ethyl, propyl, butyl and pentyl, n is an integer of from 3 to 20, and n' is an integer from 1 to about 20. Preferably, R is methyl and n and n' are 4–18. Generally, in the preparation of alumoxanes from, for example, aluminum trimethyl and water, a mixture of the linear and cyclic compounds is obtained.

The alumoxanes can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the general formula $FeSO_4 \cdot 7H_2O$. The ratio of ferrous sulfate to aluminum trimethyl is desirably about 1 mole of ferrous sulfate for 6 to 7 moles of aluminum trimethyl. The reaction is evidenced by the evolution of methane.

The mole ratio of aluminum in the alumoxane to total metal in the metallocenes which can be usefully employed can be in the range of about 0.5:1 to about 1000:1, and desirably about 1:1 to about 100:1. Preferably, the mole ratio will be in the range of 50:1 to about 5:1 and most preferably 20:1 to 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Polymerization is generally conducted at temperatures ranging between about 20° and about 300° C., preferably between about 30° and about 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation.

The catalyst systems described herein are suitable for the polymerization of olefins in solution over a wide range of pressures. Preferably, the polymerization will be completed at a pressure of from about 10 to about 3,000 bar, and generally at a pressure within the range from about 40 bar to about 2,000 bar, and most preferably, the polymerization will be completed at a pressure within the range from about 50 bar to about 1,500bar.

After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like.

In those situations wherein the molecular weight of the polymer product that would be produced at a given set of operating conditions is higher than desired, any of the techniques known in the prior art for control of molecular weight, such as the use of hydrogen and/or polymerization temperature control, may be used in the process of this invention. If so desired, the polymerization may be carried out in the presence of hydrogen to lower the polymer molecular weight. Care should be taken to assure that terminal ethenylidene unsaturation is not reduced to less than about 30 percent of the polymer chains.

Advantageously, the ethylene alpha-olefin polymer is employed in the fuel to be treated in a proportion by weight of from 50 to 1000, preferably from 100 to 600, most preferably from 350 to 450, parts per million (ppm).

In a further aspect of the invention, there is provided the use as a wax crystal modifier in a fuel oil, especially a middle distillate oil, of a composition comprising (a) a copolymer derived from ethylene and at least one alpha olefin of the formula $CH_2=CHR^1$, wherein $R^1$ is as defined above, at least 30% of the chains of which polymer have terminal ethenylidene unsaturation, the polymer having a number average molecular weight in the range of from 300 to 15000 and an ethylene content in the range of from 30 to 80% by weight, the polymer advantageously being obtainable by polymerization in the presence of a metallocene catalyst, the polymer being in combination with at least one other middle distillate cold flow improver additive. Advantageously such additive comprises (b) at least one member selected from b(i) a "comb" polymer, a linear ethylene copolymer other than one as defined above, and b(ii) a polar nitrogen compound.

The invention further provides a fuel oil composition containing the above-identified wax crystal modifier composition, and a fuel oil additive concentrate suitable for use as a wax crystal modifier comprising the composition in admixture with a fuel oil or with a solvent miscible with a fuel oil.

As examples of comb polymers there may be mentioned those of the general formula

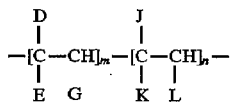

wherein D=R, COOR, OCOR, $R^2$COOR, or OR,
E=H, $CH_3$, D, or $R^2$,
G=H or D
J=H, $R^2$, $R^2$COOR, or an aryl or heterocyclic group,
K=H, $COOR^2$, $OCOR^2$, or $OR^2$, or COOH,
L=H, $R^2$, $COOR^2$, $OCOR^2$, COOH, or aryl,
$R \geq C_{10}$
$R^2 \geq C_1$,
and m and n represent mole ratios, m being within the range of from 1.0 to 0.4, n being in the range of from 0 to 0.6.

The comb polymer may contain units derived from other monomers if desired or required.

These comb polymers may be copolymers of maleic anhydride or fumaric acid and another ethylenically unsaturated monomer, e.g., an alpha olefin or an unsaturated ester, for example, vinyl acetate. It is preferred but not essential that equimolar amounts of the comonomers be used although molar proportions in the range of 2 to 1 and 1 to 2 are suitable. Examples of olefins that may be copolymerised with e.g., maleic anhyride, include 1-decene, 1-dodecene, 1-tetradecene, 1-hexadecene, and 1-octadecene.

The copolymer may be esterified by any suitable technique and although preferred it is not essential that the maleic anhydride or fumaric acid be at least 50% esterified. Examples of alcohols which may be used include n-decan-1-ol, n-dodecan-1-ol, n-tetradecan-1-ol, n-hexadecan-1-ol, and n-octadecan-1-ol. The alcohols may also include up to one methyl branch per chain, for example, 1-methyl, pentadecan-1-ol, 2-methyltridecan-1-ol. The alcohol may be a mixture of normal and single methyl branched alcohols. Each alcohol may be used to esterify copolymers of maleic anhydride with any olefins. It is preferred to use pure alcohols rather than the commercially available alcohol mixtures but if mixtures are used the $R^2$ refers to the average number of carbon atoms in the alkyl group, if alcohols that contain a branch at the 1 or 2 positions are used $R^2$ refers to the straight chain backbone segment of the alcohol. When mixtures are used, it is important that no more than 15% of the $R^2$ groups have the value $R^2+2$. The choice of the alcohol will, of course, depend upon the choice of the olefin copolymerized with maleic anhydride so that $R+R^2$ is within the range of 18 to 38. The preferred value of $R+R^2$ may depend upon the boiling characteristics of the fuel in which the additive is to be used.

These comb polymers may also be fumarate polymers and copolymers such for example as those described in European Patent Applications 0153176 and 0153177. Other suitable comb polymers are the polymers and copolymers of alpha olefins and esterified copolymers of styrene and maleic anhydride, and esterified copolymers of styrene and fumaric acid.

The linear copolymer may be a copolymer of ethylene with an unsaturated monocarboxylic acid ester. The ester may be an ester of an unsaturated carboxylic acid with a saturated alcohol or, which is preferred, an ester of a saturated carboxylic acid with an unsaturated alcohol. Examples of the former are methyl acrylate, ethyl acrylate, butyl acrylate, methyl methacrylate, ethyl methacrylate, butyl methacrylate, lauryl acrylate, isopropyl acrylate, and isobutyl acrylate. Examples of the latter are vinyl acetate, propionate, butyrate, and isobutyrate. The preferred copolymer is an ethylene-vinyl acetate copolymer.

The copolymer advantageously contains from 10 to 50%, preferably advantageously at least 25%, by weight of the ester.

The number average molecular weight of the ethylene-unsaturated ester copolymer is advantageously at most 7500, and is more advantageously in the range of 850 to 4000, preferably 1250 to 3500, and most preferably about 3,000, as measured by vapour phase osmometry.

Linear polymers derived from alkylene, e.g., ethylene, oxides, for example polyethylene glycol esters, and amino derivatives thereof, may also be used.

Alternatively, the copolymer may be an ethylene-α-olefin copolymer, advantageously with a number average molecular weight of at most 7500, preferably from 2000 to 5000, as measured by vapour phase osmometry. Appropriate α-olefines are as given above with reference to component (a), or styrene, with propylene again being preferred. Advantageously the ethylene content is from 50 to 65% by weight although for ethylene-propylene copolymers up to 80% by weight ethylene may be employed with advantage.

The polar nitrogen compounds are generally amine salts and/or amides formed by reaction of at least one molar proportion of a hydrocarbyl substituted amine with a molar proportion of a hydrocarbyl acid having from 1 to 4 carboxylic acid groups or an anhydride thereof; ester/amides may also be used containing 30 to 300, preferably 50 to 150, total carbon atoms. These nitrogen compounds are described in U.S. Pat. No. 4,211,534. Suitable amines are usually long chain $C_{12}$–$C_{40}$ primary, secondary, tertiary or quaternary amines or mixtures thereof but shorter chain amines may be used provided the resulting polar nitrogen compound is oil soluble; it will therefore normally contain about 30 to 300 total carbon atoms. The polar nitrogen compound preferably contains at least one straight chain $C_8$ to $C_{24}$ alkyl segment.

Suitable amines include primary, tertiary or quaternary, but are preferably secondary, amines. Tertiary and quaternary amines only form amine salts. Examples of amines include tetradecyl amine, cocoamine, and hydrogenated tallow amine. Examples of secondary amines include dioctadecyl amine and methyl-behenyl amine. Amine mixtures are also suitable and many amines derived from natural materials are mixtures. A preferred amine is a secondary hydrogenated tallow amine of the formula $HNR_3R_4$ wherein $R_3$ and $R_4$ are alkyl groups derived from hydrogenated tallow fat composed of approximately 4% $C_{14}$, 31% $C_{16}$, 59% $C_{18}$.

Examples of suitable carboxylic acids (and their anhydrides) for preparing these nitrogen compounds include cyclohexane-1,2-dicarboxylic acid, cyclohexene-1,2 dicarboxylic acid, cyclopentane-1,2-dicarboxylic acid, and naphthalene dicarboxylic acid. Generally, these acids will have about 5–13 carbon atoms in the cyclic moiety. Preferred acids are benzene dicarboxylic acids such as phthalic acid, isophthalic acid, and terephthalic acid. Phthalic acid or its anhydride is particularly preferred. The particularly preferred compound is the amide-amine salt formed by reacting 1 molar portion of phthalic anhydride with 2 molar portions of di-hydrogenated tallow amine. Another preferred compound is the diamide formed by dehydrating this amide-amine salt.

Advantageously, the composition comprises the polymer component (a), a polymer selected from component b(i), e.g., the comb polymer, and a compound selected from component b(ii), the polar nitrogen compound.

In addition, the composition may optionally comprise other fuel oil additives, many of which are in use in the art or known from the literature.

In a further embodiment of the invention, the composition comprises the polymer component (a), an ethylene/unsaturated ester copolymer and, optionally but preferably, a polar nitrogen compound. The composition may also comprise a comb polymer. As ethylene/unsaturated ester copolymer component there may more especially be mentioned ethylene/carboxylic acid esters with unsaturated alcohols, more especially ethylene/vinyl propionate or, preferably, vinyl acetazte copolymers. Many such copolymers are commercially available, those preferred in this embodiment having ranges of ester contents from 10 to 50% by weight, number average molecular weight from 1500 to 6000, and a degree of branching corresponding to up to about 10 branches per 100 carbon atoms of the molecule.

Advantageously, the composition is used in a concentration in the range of from 0.001% to 0.5% by weight, of active components, based on the weight of fuel, preferably from 0.01 to 0.1%, and most preferably from 0.05 to 0.09%, by weight of active components.

In compositions containing components (a), b(i) and b(ii), the components are advantageously present in proportions by weight in the range:

(a) :10
b(i) :1 to 10, preferably 1 to 5
b(ii): 1 to 10, preferably 1 to 5.

In compositions containing component (a) but only one of component b(i) or b(ii), the proportion of the (b) component, per 10 parts of (a) by weight, is advantageously in the range 2 to 10, preferably 4 to 10, by weight. Advantageously, the (b) component is component b(ii).

Compositions containing components (a) and b(ii) and compositions containing all three components show significant reductions in CFPP, inhibition of wax settling, and improved programmed cooling test (PCT) filterability in fuel oil compositions.

The following examples illustrate the invention:

EXAMPLE 1

Preparation of Ethylene-Propylene Copolymer

A 1 liter Zipperclave reactor (Autoclave Engineers) equipped with a water jacket for temperature control, with a septum inlet for syringe injection of catalyst, and with a supply of purified nitrogen, liquid propylene, and ethylene was used used in these polymerizations. The reactor was cleaned with hot toluene and then was purged well with dry nitrogen at 100° C. The reactor was cooled to 25° C. and 10.0 cc of a 4.0 wt. % toluene solution of methylalumoxane was injected along with 100 cc of distilled toluene at 0 psig under nitrogen. Liquid propylene monomer (200 cc) was added from a calibrated burette at 25° C. The reactor contents were stirred and heated to 115°C. at which point the reactor pressure was 375 psig. 1.00 cc of a toluene solution of bis(n-butylcyclopentadienyl) zirconium dichloride (1.00 mg) was injected and ethylene at a pressure of 405 psig was immediately supplied. Ethylene was fed on pressure demand in order to keep the system pressure at 405 psig. The rate of ethylene flow was recorded continuously during the course of the polymerization. The reaction was continued for 15 minutes after which the reaction was stopped by rapidly depressuring and cooling the reactor to 25° C. The polymer product was collected and the toluene solvent was evaporated in an air stream. The polymer weight was determined to be 103.1 gms, and the polymer was analyzed by size-exclusion chromatography and found to contain 68 wt. % ethylene and to have a number average molecular weight of 1100, a weight average molecular weight of 5400 and a polydispersity of 4.9. The polymer product was found to contain 2.5 wppm Zr and 1.75 wppm Cl.

EXAMPLE 2

Preparation of Ethylene-Propylene Copolymer

The polymerization was performed as in Example 1 except that the reactor temperature was maintained at 100° C. and 1.00 mg of dimethylsilyldicyclopentadienyl zirconium dichoride was used as catalyst instead of bis(n-butylcyclopentadienyl) zirconium dichloride. The reactor pressure was maintained at 380 psig by a regulated ethylene supply. The yield of the copolymer was 111.2 gms and the polymer was determined to contain an ethylene content of 68% and to have a number average molecular weight of 1390, a weight average molecular weight of 4030 and polydispersity of 2.9. The polymer product was found to contain 2.0 wppm Zr and 1.5 wppm Cl.

EXAMPLE 3

Preparation of Ethylene-Propylene Copolymer

The polymerization was performed as in Example 2 except that the reactor temperature was maintained at 90° C.

and 270 cc of liquid propylene was charged. The reactor pressure was maintained by a regulated ethylene supply. The yield of the copolymer was 16.3 gms and the polymer was determined to contain an ethylene content of 56% and to have a number average molecular weight of 1750, a weight average molecular weight of 4960 and polydispersity of 2.8. The polymer product was found to contain 16 wppm Zr and 10 wppm Cl.

EXAMPLE 4

Preparation of Ethylene-Propylene Copolymer

The polymerization was performed as in Example 3 except that the reactor temperature was maintained at 80° C. The reactor pressure was maintained at 365 psig by a regulated ethylene supply for 1 hour. The yield of the copolymer was 234 gms and the polymer was determined to have a number average molecular weight of 2710, a weight average molecular weight of 7980 and polydispersity of 2.9. The polymer product was found to contain an ethylene content of 59% and to contain 1.0 wppm Zr and 0.7 wppm Cl.

EXAMPLE 5

Preparation of Ethylene Butene-1 Copolymer

The polymerization was performed as in Example 3 except that 270 cc of liquid butene-1 was charged instead of the propylene. The reactor pressure was maintained at 167 psig by a regulated ethylene supply. The yield of the copolymer was 176.6 gms and the polymer was determined to have a number average molecular weight of 860, a weight average molecular weight of 2710 and polydispersity of 3.1. The polymer product was found to contain 1.5 wppm Zr and 1.1 wppm Cl.

In the following numbered examples the ethylene-propylene copolymers, prepared by methods analagous to that described in Example 1, all had terminal ethenylidene unsaturation in excess of 30%.

The percentage of polymer chains having terminal ethenylidene unsaturation of certain of the polymers used is as follows:

| Example    | 6  | 8  | 9  | 10 | 18 | 53 |
|------------|----|----|----|----|----|----|
| Percentage | 40 | 79 | 75 | 66 | 50 | 65 |

Examples 6 to 13 and Comparative Examples A and B

Ethylene-propylene copolymers of various number average molecular weights (Mn) and ethylene contents (component (a)), prepared by a method analogous to that described in Example 1 were blended in the following proportions by weight with components b(i) and b(ii).

(a):b(i):b(ii)-3:1:1.

In this and in the following examples, component b(i) is a comb polymer in which, referring to the general formula above, G=D=COOR, R=$C_{14}$; E=H; J=L=H; and K=OCOCH$_3$ and component b(ii) is the amide/amine salt from the reaction of phthalic anhydride and two moles of dihydrogenated tallow amine.

Each composition as described above is blended at a total treat rate of 700 ppm with Tank 198 fuel oil having a CFPP of −2° C. The results are shown in Table 1.

TABLE 1

| Example | Mole % $C_2$ | % $C_3$ | Mn | CFPP, °C. |
|---------|--------------|---------|-------|-----------|
| A       | 94           | 9       | 1450  | −8        |
| 6       | 79           | 28      | 1390  | −15       |
| 7       | 66           | 44      | 1390  | −16       |
| 8       | 63           | 47      | 1530  | −16       |
| 9       | 57           | 53      | 1740  | −8        |
| 10      | 54           | 56      | 1600  | −10       |
| 11      | 75           | 33      | 2710  | −16       |
| 12      | 68           | 41      | 3220  | −17       |
| 13      | 80           | 27      | 12250 | −9        |
| B       | Pf 226       |         |       | −14       |

The reduction in CFPP at $C_3$ levels from 28% to 47% (molar ethylene levels 63 to 79%) is apparent, and compares favorably with that achieved with Pf 226, an ethylene-vinyl acetate copolymer product commercially used in Tank 198 fuel oil to reduce CFPP. Pf 226 contains a copolymer having 36.5% by weight vinyl ester, Mn 2580, and a copolymer having 13.5% by weight vinyl ester, Mn 5000, in a weight ratio of 1.9:1.

Examples 14 to 20 and Comparative Examples C, D, AND E

Ethylene-propylene copolymers of various number average molecular weight (Mn) and weight % propylene content (component (a)) prepared by methods analogous to those of Examples 1 to 5 were blended with the same component b(ii) as in Examples 6 to 13 in equal proportions by weight, 300 ppm of the resulting composition being blended with 80126/89 fuel oil having a CFPP of −11° C. The results are shown in Table 2.

TABLE 2

| Example | Mole % $C_2$ | % $C_3$ | Mn    | CFPP, °C. |
|---------|--------------|---------|-------|-----------|
| C       | 94           | 9       | 1450  | −13       |
| 14      | 79           | 28      | 1390  | −25       |
| 15      | 67           | 42      | 710   | −26       |
| 16      | 63           | 47      | 1530  | −23       |
| 17      | 54           | 56      | 1600  | −28       |
| 18      | 84           | 22      | 3180  | −24       |
| 19      | 68           | 41      | 3220  | −29       |
| 20      | 80           | 27      | 12250 | −21       |
| D       | 33           | 75      | 1450  | −17       |
| E       | ECA 8400     |         |       | −24       |

The reduction in CFPP at $C_3$ levels of from 27 to 56% by weight (ethylene content 54 to 80 mole percent) compares favorably with that achieved by ECA 8400, an ethylene-vinyl acetate polymer suitable to reduce CFPP in this fuel.

Examples 21 to 24 and Comparative Examples F, G, H, and J

In these Examples, the PCT filterability of Tank 198 fuel oil was measured, using additive blends at two different ratios; in Examples 21 to 23, F and G, the ratios were:

| Component | (a) | (b) | (c) |
|---|---|---|---|
| | 3 | 1 | 1 |

In Examples 24 to 26, H and J the ratios were

| | | | |
|---|---|---|---|
| | 1 | 1 | 1 |

In the PCT test, the fuel oil is cooled at 1° C. per hour to −13° C., at which temperature each fuel containing the blend at 700 ppm is passed through a series of meshes increasing in fineness - through 80, 100, 120, 150, 200, 250, 350, VW, and LTFT, and the finest mesh passed is noted. The results are shown in Table 3.

TABLE 3

| Example | Mole % $C_2$ | % $C_3$ | Mn | Ratio | Finest Mesh | Ranking |
|---|---|---|---|---|---|---|
| F | 94 | 9 | 1450 | 3:1:1 | 150 | 4 |
| 21 | 79 | 28 | 1390 | 3:1:1 | LTFT | 1 |
| 22 | 66 | 44 | 1390 | 3:1:1 | 150 | 4 |
| 23 | 63 | 47 | 1530 | 3:1:1 | VW | 2 |
| G | | Pf 226 | | 3:1:1 | VW | 2 |
| H | 94 | 9 | 1450 | 1:1:1 | 80 | 5 |
| 24 | 79 | 28 | 1390 | 1:1:1 | VW | 2 |
| 25 | 66 | 44 | 1390 | 1:1:1 | 200 | 3 |
| 26 | 63 | 47 | 1530 | 1:1:1 | 150 | 4 |
| J | | Pf 226 | | 1:1:1 | LTFT | 1 |

Examples 27 to 30 and Comparative Examples K and L

Tests similar to those in Examples 21 to 26 were carried out with a 1:1 blend of ethylene propylene copolymer and component b(ii) in Fuel oil 80126/89, at a treat rate of 300 ppm, the PCT tests being carried out at −20° C. The results are shown in Table 4.

TABLE 4

| Example | Mole % $C_2$ | $C_3$ | Mn | Finest Mesh | Ranking |
|---|---|---|---|---|---|
| K | 94 | 9 | 1450 | 120 | 5 |
| 27 | 79 | 28 | 1390 | VW | 1 |
| 28 | 68 | 41 | 1750 | VW | 1 |
| 29 | 63 | 47 | 1530 | 250 | 4 |
| 30 | 54 | 56 | 1600 | VW | 1 |
| L | | ECA 8400 | | 100 | 6 |

EXAMPLE 31

Various EPC polymers were used to form an additive package similar to that, for example, of Example 6 and added in the same concentration to Tank 198 fuel, samples of which were then cooled in measuring cylinders at 2° C. per hour to −12° C., and inspected visually after 3 days to ascertain the degree of inhibition of wax settling; the numbers shown in the accompanying Figure show positions each corresponding to a single sample.

The figure is a plot of Molecular Weight (Mn, given in Thousands) against the molar ethylene content of the various polymers. The numbers shown on the graph represent the degrees of settling:

| Value | Description of Fuel |
|---|---|
| 0 | gel |
| 1,2 | hazy, or slightly cloudy, with dense wax layer |
| 3 to 5 | cloudy, with more dispersed wax layer |
| 6 to 8 | very cloudy, but wax layer still visible |
| 10 | no wax settled |

EXAMPLE 32

500 ppm of an ethylene-propylene copolymer prepared by a method analogous to that of Example 1, having an Mn of 1400, and a propylene content of 44%, (66 mole percent ethylene) was added to Tank 198 Fuel Oil. For comparison, Pd 25, an ethylene-vinyl acetate copolymer effective to reduce CFPP in this fuel, was added at the same treat rate. The CFPP's of the fuels were compared.

| Fuel | CFPP, °C. |
|---|---|
| Base Fuel | −2 |
| ethylene-propylene copolymer | −15 |
| Pd 25 | −16 |

EXAMPLES 33 to 41

The effect of varying the comb polymer on wax settlement was observed by a procedure similar to that of Example 31.

In each of the Examples an ethylene-propylene copolymer (propylene content 53% by weight, 57 molar percent ethylene) prepared by a method analogous to that of Example 1 was used. In Examples 33, 36 and 39, the copolymer had Mn=3050, in Examples 34, 37 and 40, Mn=2480 and in Examples 35, 38 and 41, Mn=1740.

Two fumarate ester-vinyl acetate (FVA) polymers were tested; in Examples 33 to 35 a mixed $C_{12}/C_{14}$ fumarate ester was employed, in Examples 36 to 38, a $C_{14}$ fumarate ester was employed. The same component b(ii) was used as in Example 6; the fuel was Tank 198, and the proportions of additive were a:b(i):b(ii)=2:1:1, at a total treat rate of 900 ppm. The results of the test, after 3 days at −12° C., using the same WAS terminology as in Example 31, were as shown in Table 5.

TABLE 5

| Example | FVA - ester chain length | WAS No. |
|---|---|---|
| 33 | $C_{12}/C_{14}$ | 1 |
| 34 | $C_{12}/C_{14}$ | 1 |
| 35 | $C_{12}/C_{14}$ | 1 |
| 36 | $C_{14}$ | 8 |
| 37 | $C_{14}$ | 7 |
| 38 | $C_{14}$ | 7 |
| 39 | none | 1 |
| 40 | none | 1 |
| 41 | none | 2 |

EXAMPLES 42 TO 46

The effect on wax settlement and CFPP of changing the proportions of the components in the compositions was observed in tests on Tank 198 Fuel Oil, using components b(i) and b(ii) as in Example 6 at a total treat rate of 500 ppm. The results are shown in Table 6.

TABLE 6

| Example | Proportions a:b(i):b(ii) | CFPP, °C. | WAS No. |
|---|---|---|---|
| 42 | 1:0:0 | −11 | 1 |
| 43 | 1:1:1 | −12 | 7 |
| 44 | 1:2:1 | −10 | 3 |
| 45 | 2:1:1 | −12 | 10 |
| 46 | 3:1:1 | −14 | 10 |

The results show that, while effective wax dispersion requires component b(i), too high a proportion may reduce wax dispersion.

Examples 47 to 56 and Comparative Examples M and N

CFPP tests similar to those described in Example 6 were carried out on Tank 198 fuel oil (CFPP, −2° C.) containing as sole additive various ethylene-propylene copolymers at a treat rate of 300 ppm. The results are shown in Table 7.

TABLE 7

| Example | Mole % $C_2$ | % $C_3$ | Mn | CFPP, °C. |
|---|---|---|---|---|
| M | 94 | 9 | 1450 | −5 |
| 47 | 84 | 22 | 3180 | −12 |
| 48 | 79 | 28 | 1390 | −10 |
| 49 | 75 | 33 | 2710 | −14 |
| 50 | 74 | 34 | 770 | −15 |
| 51 | 68 | 41 | 1750 | −14 |
| 52 | 66 | 44 | 1390 | −13 |
| 53 | 57 | 53 | 3050 | −10 |
| 54 | 54 | 56 | 1600 | −5 |
| 55 | 84 | 22 | 10240 | −10 |
| 56 | 80 | 27 | 12250 | −11 |
| N | 33 | 75 | 1450 | −3 |

The results show a maximum activity in this fuel oil at a propylene content of 20 to 50%, more especially 30 to 50%, and indicate that the EPC is effective as sole additive to reduce CFPP at low treat levels.

Examples 57 to 64 and Comparative Examples P, R and S

Ethylene-propylene copolymers as used in Examples 15 (42% by weight propylene, 67 mole % ethylene, Mn 710) and 19 (41%, 68 mole % ethylene, Mn 3220) were used alone or together with an ethylene/vinyl acetate copolymer, in all cases with the amide/amine salt used in Examples 6 to 13, in fuel 80126/89.

In Table 8 below, there are shown the CFPP (in °C.) and WAS performance (ratings as given in Example 31) of fuel compositions containing 150 ppm of the amide/amine salt and 150 ppm of (i) the ethylene/propylene copolymer, (ii) the ethylene/vinyl acetate copolymer, or (iii) the two copolymers in the weight ratios given.

TABLE 8

| Example No. | CFPP | WAS |
|---|---|---|
| Comparison P (EVA I) | −29 | 4 |
| Comparison R (EVA II) | −28 | 4 |
| Comparison S (EVA III) | −26 | 5 |
| 57 (Copolymer of Ex. 14) | −15 | 5 |
| 58 (Copolymer of Ex. 18) | −26 | 4 |

| | Weight Ratio of EVA:EP Copolymer | | | | | |
|---|---|---|---|---|---|---|
| | 1:3 | | 1:1 | | 3:1 | |
| | CFPP | WAS | CFPP | WAS | CFPP | WAS |
| 59 (EVA I + Ex. 15) | −27 | 4 | −25 | 4 | −30 | 4 |
| 60 (EVA I + Ex. 19) | −28 | 4 | −29 | 4 | −29 | 4 |
| 61 (EVA II + EX. 15) | −16 | 5 | −21 | 4 | −20 | 5 |
| 62 (EVA II + Ex. 19) | −29 | 5 | −29 | 5 | −29 | 4 |
| 63 (EVA III + Ex. 15) | −25 | 5 | −25 | 5 | −26 | 5 |
| 64 (EVA III + Ex. 19) | −27 | 5 | −27 | 4 | −23 | 3 |

EVA I is ECA 8400—Comparative Example E.

EVA II is a copolymer with about 36% by weight vinyl acetate, Mn about 3000.

EVA III is a copolymer with about 14% by weight vinyl acetate, Mn about 5000.

The results show that an ethylene propylene copolymer and an ethylene/vinyl acetate copolymer may be employed together as flow improvers and wax antisettling additives.

We claim:

1. A fuel additive concentrate comprising 2 to 90% by weight of (a) a copolymer derived from ethylene and at least one alpha olefin of the formula $CH_2=CHR^1$, wherein $R^1$ represents an alkyl group having 1 to 18 carbon atoms, at least 30% of the chains of which polymer have terminal ethenylidene unsaturation, the polymer having a number average molecular weight (Mn) in the range of from 300 to 15000 and an ethylene content in the range of from 40 to 90 molar percent, and (b) at least one middle distillate cold flow improver additive other than the copolymer (a), said (a) and (b) materials being in admixture with a fuel oil or a solvent miscible with fuel oil.

2. A concentrate as claimed in claim 1 wherein component (b) comprises at least one material selected from (b(i)) "comb" polymers and linear ethylene copolymers other than copolymer (a) and (b(ii)) polar nitrogen compounds.

3. A concentrate as claim in claim 2, wherein the ethylene/alpha-olefin copolymer (a) is an ethylene-propylene copolymer.

4. A concentrate as claimed in claim 3, wherein the copolymer (a) has an Mn in the range of from 600 to 10000.

5. A concentrate as claimed in claim 4 wherein the copolymer (a) has an Mn of from 700 to 5000.

6. A concentrate as claimed in claim 5, wherein the copolymer (a) has an Mn of from 700 to 3500.

7. A concentrate as claimed in claim 1 wherein the molar ethylene content of the copolymer (a) is from 50% to 80%.

8. A concentrate as claimed in claim 7, wherein the molar ethylene content of the copolymer (a) is from 60% to 80.

9. A concentrate as claimed in claim 1 wherein the copolymer (a) is obtained by polymerization in the presence of a metallocene catalyst.

10. A concentrate as claimed in claim 9 wherein a comb polymer is present and is a copolymer of (a) fumaric acid or maleic acid or anhydride and (b) an ethlenically unsaturated monomer copolymerizable therewith, the acid or anhydride groups being at least partially esterified by hydrocarbon groups having at least 10 carbon atoms.

11. A concentrate as claimed in claim 10, wherein the ethylenically unsaturated monomer is vinyl acetate.

12. A concentrate as claimed in claim 1 wherein a polar nitrogen compound is present, and is a reaction product of a hydrocarbylamine and a hydrocarbyl acid.

13. A concentrate as claimed in claim 12, wherein the amine is a di hydrogenated tallow amine.

14. A concentrate as claimed in claim 12, wherein the acid is phthalic acid.

* * * * *